(12) United States Patent
Nolan et al.

(10) Patent No.: US 11,390,511 B2
(45) Date of Patent: Jul. 19, 2022

(54) GARDENING APPARATUS

(71) Applicant: Richard E. Nolan, Roswell, GA (US)

(72) Inventors: Richard E. Nolan, Roswell, GA (US); Ravi Navare, Mableton, GA (US)

(73) Assignee: Richard E. Nolan, Roswell, GA (US)

( * ) Notice: Subject to any disclaimer, the term of this patent is extended or adjusted under 35 U.S.C. 154(b) by 0 days.

(21) Appl. No.: 17/306,781

(22) Filed: May 3, 2021

(65) Prior Publication Data

US 2021/0253412 A1 Aug. 19, 2021

Related U.S. Application Data

(63) Continuation-in-part of application No. PCT/IB2019/059461, filed on Nov. 4, 2019.

(60) Provisional application No. 62/755,215, filed on Nov. 2, 2018.

(51) Int. Cl.
*B67C 11/02* (2006.01)
*A01C 7/20* (2006.01)
*A01C 15/02* (2006.01)

(52) U.S. Cl.
CPC .............. *B67C 11/02* (2013.01); *A01C 7/206* (2013.01); *A01C 15/02* (2013.01)

(58) Field of Classification Search
CPC .......... B67C 11/00; A01C 7/206; A01C 15/02
USPC .................................................. 141/331–345
See application file for complete search history.

(56) References Cited

U.S. PATENT DOCUMENTS

| | | | | |
|---|---|---|---|---|
| 1,606,342 A | * | 11/1926 | Bruce | F16N 31/002 184/1.5 |
| 1,612,383 A | * | 12/1926 | Lepeshkin | B67C 11/02 141/300 |
| 2,531,288 A | * | 11/1950 | Moore | F16L 27/1275 137/547 |
| 3,939,884 A | * | 2/1976 | Mader | B67C 11/02 141/333 |
| 4,130,147 A | * | 12/1978 | Langlie | B67C 11/02 141/333 |
| 4,600,125 A | * | 7/1986 | Maynard, Jr. | B67B 7/28 141/330 |
| 5,168,908 A | * | 12/1992 | Boyum | B67C 11/02 141/331 |

(Continued)

FOREIGN PATENT DOCUMENTS

CN 206442742 8/2017
DE 147303 4/1981
(Continued)

*Primary Examiner* — Timothy L Maust

(57) ABSTRACT

A gardening apparatus includes a feeder cup, a connector, and a central axis. The feeder cup includes a first pouring section, a second pouring section, a third pouring section, and a fourth pouring section. The feeder cup and the connector are concentrically aligned along the central axis. The feeder cup and the connector are adjacently connected to each other as the feeder cup provide storage area for water or fertilizer. The first pouring section, the second pouring section, the third pouring section, and the fourth pouring section are radially integrated into the feeder cup to channel through the stored water or fertilizer. The connector functions as a fastening body to secure the feeder cup to existing watering wands or a handle so that the hard-to-reach botanical can be reached.

9 Claims, 9 Drawing Sheets

(56) References Cited

U.S. PATENT DOCUMENTS

| | | | | |
|---|---|---|---|---|
| 5,349,997 | A * | 9/1994 | Rial | A01G 25/14 |
| | | | | 138/155 |
| 5,472,025 | A * | 12/1995 | Conrad | B65B 39/007 |
| | | | | 141/331 |
| 5,921,296 | A * | 7/1999 | Porter | B67C 11/02 |
| | | | | 141/340 |
| D432,915 | S * | 10/2000 | Smith | D9/436 |
| 6,425,424 | B1 * | 7/2002 | Ellis Calvo | B65B 39/00 |
| | | | | 141/331 |
| 6,561,387 | B1 * | 5/2003 | Slawson | B01J 47/10 |
| | | | | 137/360 |
| 7,308,920 | B1 * | 12/2007 | Theis | A01G 25/14 |
| | | | | 141/331 |
| D716,112 | S * | 10/2014 | Cranstoun | D7/700 |
| D719,414 | S * | 12/2014 | Hester | D7/700 |
| 8,973,625 | B2 * | 3/2015 | Liao | B67C 11/02 |
| | | | | 141/332 |
| 10,519,019 | B2 * | 12/2019 | Kuo | B67C 11/02 |
| 2008/0142114 | A1 * | 6/2008 | Cook | B65B 39/00 |
| | | | | 141/331 |

FOREIGN PATENT DOCUMENTS

| | | |
|---|---|---|
| RU | 134398 | 11/2013 |
| RU | 173459 | 8/2017 |
| WO | WO2011035822 A1 | 3/2011 |

* cited by examiner

GARDENING APPARATUS

The current application is a continuation-in-part (CIP) application of the international Patent Cooperation Treaty (PCT) application PCT/IB2019/059461 filed on Nov. 4, 2019. The PCT application PCT/IB2019/059461 claims a priority to the U.S. Provisional Patent application Ser. No. 62/755,215 filed on Nov. 2, 2018. The current application is filed on May 3, 2021 while May 2, 2021 was on a weekend.

FIELD OF THE INVENTION

The present invention relates generally to a device for watering/feeding hanging plants or similar hard-to-reach botanicals. The present invention may be employed in a standalone configuration, or as an attachable component for existing watering wands.

BACKGROUND OF THE INVENTION

In present times, individuals are known to enjoy home gardening and botany as a personal hobby and practical approach to acquiring fresh vegetables, spices, or to enhance the aesthetic qualities of one's home. A variety of tools have been developed to allow users to reach up to hanging baskets, overhead pots, vertically tiered hydroponics, or into deep planter boxes safely and comfortably. These tools are generally understood to allow a user to dispense water, fertilizer, or other materials in a targeted manner without excess exertion, risk, or difficulty. Individuals with compromised or decreased motor skills, such as the elderly and the infirm, may find such tools particularly useful in avoiding potential injury when climbing ladders and stools, leaning across planter beds, or servicing other hard-to-reach sections of their garden. Some versions of said tools include connections to a pressurized water source such to dispense water continuously, while others are used in a more limited capacity for dispensation of smaller quantities of water or special materials such as seeds, fertilizer, pesticides, fungicides, or other materials generally understood to be used in home gardening.

The present invention aims to enable a user to assemble and employ a watering or fertilizing tool featuring a novel construction suitable for a variety of applications. Additionally, the present invention possesses unique features that may expand and enhance the functionality of gardening tools and systems known in the industry, without compromising the original intended functions of said systems. The present invention further provides a structural body to attach various items to various faces of the present invention to serve as functional storage, to carry promotional placards or product samples, to serve as an attachment to external systems (as described), or any other functions that may arise from use of the present invention in any context without departing from the original scope of the invention.

SUMMARY OF THE INVENTION

The present invention aims to enable a user to assemble and employ a watering or fertilizing tool featuring a novel construction suitable for a variety of applications. Additionally, the present invention possesses unique features that may expand and enhance the functionality of gardening tools and systems known in the industry, without compromising the original intended functions of said systems. The present invention further provides a structural body to attach various items to various faces of the present invention to serve as functional storage, to carry promotional placards or product samples, to serve as an attachment to external systems (as described), or any other functions that may arise from use of the present invention in any context without departing from the original scope of the invention.

DETAIL DESCRIPTIONS OF THE INVENTION

All illustrations of the drawings are for the purpose of describing selected versions of the present invention and are not intended to limit the scope of the present invention.

The present invention is a gardening apparatus that aims to enable a user to utilize as a watering or fertilizing tool for a variety of gardening applications. More specifically, the present invention is utilized for watering/feeding hanging plants or similar hard-to-reach botanicals. Additionally, the present invention possesses unique features that may expand and enhance the functionality of gardening tools and systems known in the industry, without compromising the original intended functions of those existing gardening tools and systems.

A first embodiment of the present invention comprises a feeder cup 1, a connector 6, and a central axis 15 as shown in FIGS. 1-3 and FIG. 9. In reference to a general configuration of the first embodiment, the feeder cup 1 and the connector 6 are concentrically aligned along the central axis 15 as the feeder cup 1 and the connector 6 are adjacently connected to each other. The feeder cup 1 delineates a reservoir for storage of water or fertilizer while the connector 6 functions as a fastening body between the feeder cup 1 and an existing watering wand. More specifically, the connector 6 is an internally threaded body so that the first embodiment can be threaded onto existing watering wands. For example, the user has to unscrew a head of the existing watering wand and expose a threaded portion of the existing water wand so that the connector 6 can be screwed onto the threaded portion of the existing water wand. As a result, a handle portion of the existing watering wand functions similar to an extension-handle for the first embodiment thus enabling the feeder cup 1 to water/feed hanging plants or similar hard-to-reach botanicals. Even though the connector 6 is threaded onto the existing watering wands, the attachment between the existing watering wands and the connector 6 can include any types of attachment mechanisms such as friction-fit fastening mechanism, magnetic fastening mechanism, adhesive fastening mechanism, quick-connect fastening mechanism, and any other types of easily detachable fastening mechanisms.

Figure 4:
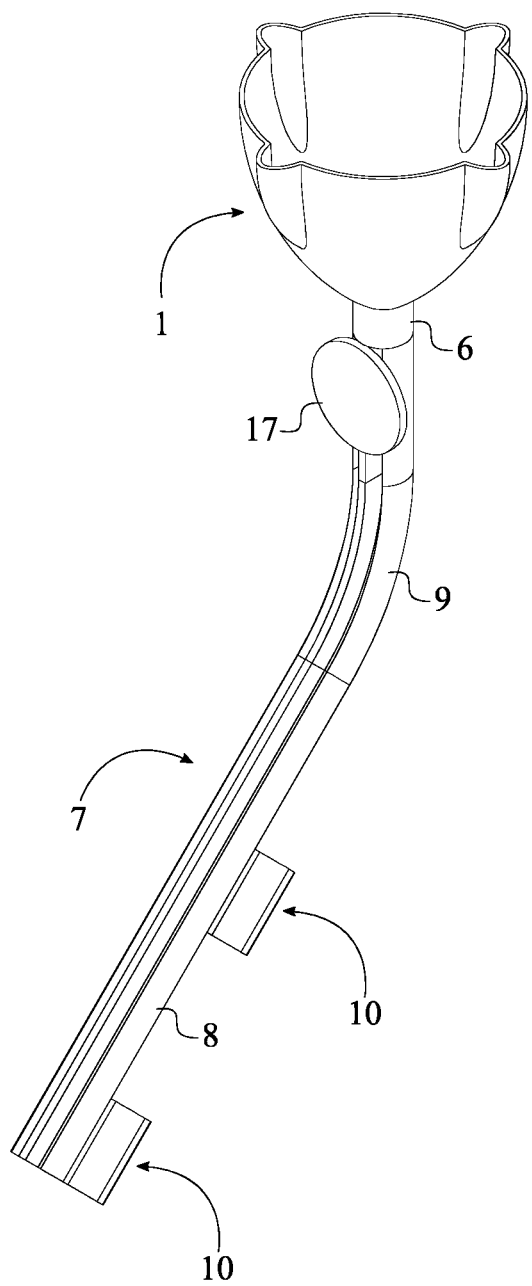
FIG. 4 is a top perspective view of the second embodiment of the present invention, showing the inside of the feeder cup.
Figure 5:
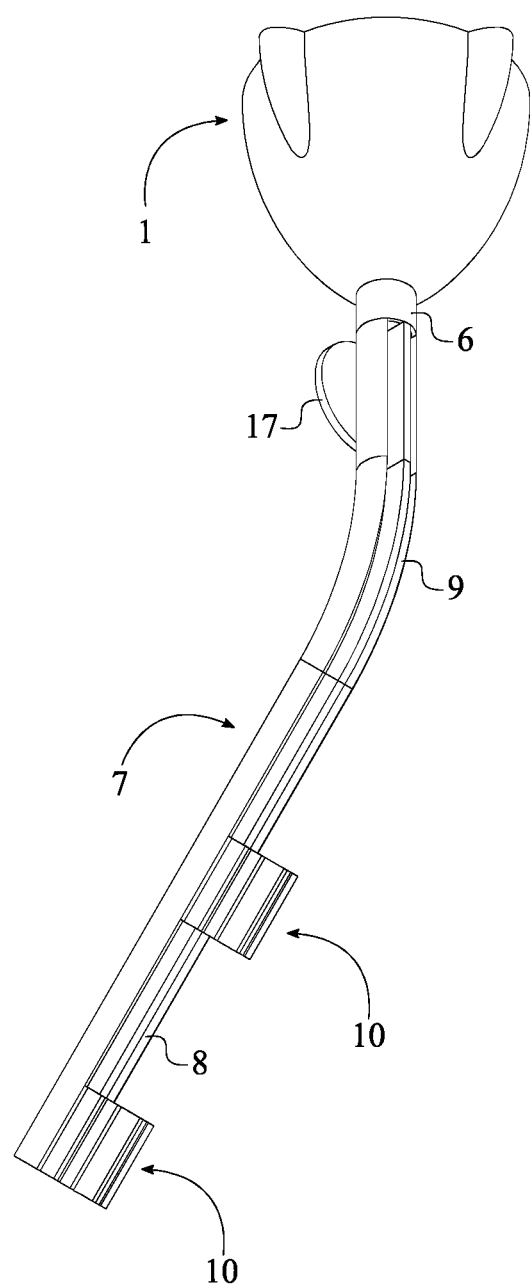
FIG. 5 is a bottom perspective view of the second embodiment of the present invention, showing the plurality of attachments.
Figure 6:
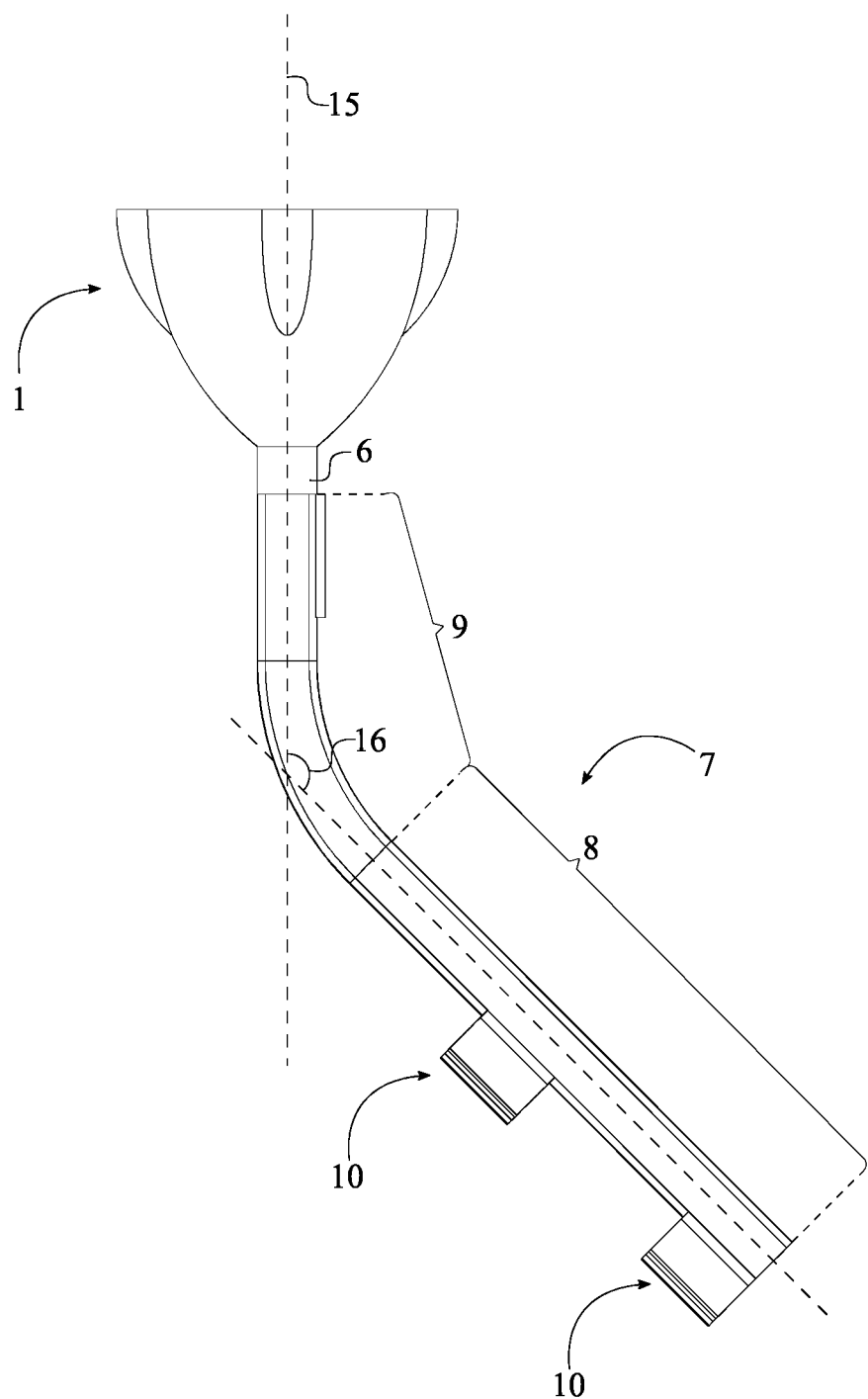
FIG. 6 is a side view of the second embodiment of the present invention, showing the obtuse angle between the bend section and the straight section.

A second embodiment of the present invention further comprises a handle in addition to the feeder cup 1, the connector 6, and the central axis 15 as shown in FIG. 4-5. Furthermore, the handle 7 comprises a straight section 8 and a bend section 9 as shown in FIG. 4-6. In reference to a general configuration of the second embodiment, the feeder cup 1 and the connector 6 are concentrically aligned along the central axis 15 as the feeder cup 1 and the connector 6 are adjacently connected to each other. The feeder cup 1 delineates a reservoir for storage of water or fertilizer while the connector 6 functions as a fastening body between the feeder cup 1 and the handle 7. More specifically, the bend section 9 is angularly connected to the straight section 8 so that the handle 7 can be delineated as an elongated body. The connector 6 is terminally connected to the bend section 9 and positioned opposite of the straight section 8. As a result, the handle 7 functions similar to an extension-handle for the second embodiment thus enabling the feeder cup 1 to water/feed hanging plants or similar hard-to-reach botanicals. Due to the permanent connection between the feeder cup 1 and the bend section 9, the second embodiment is manufactured or formed as a single body apparatus.

Figure 1:
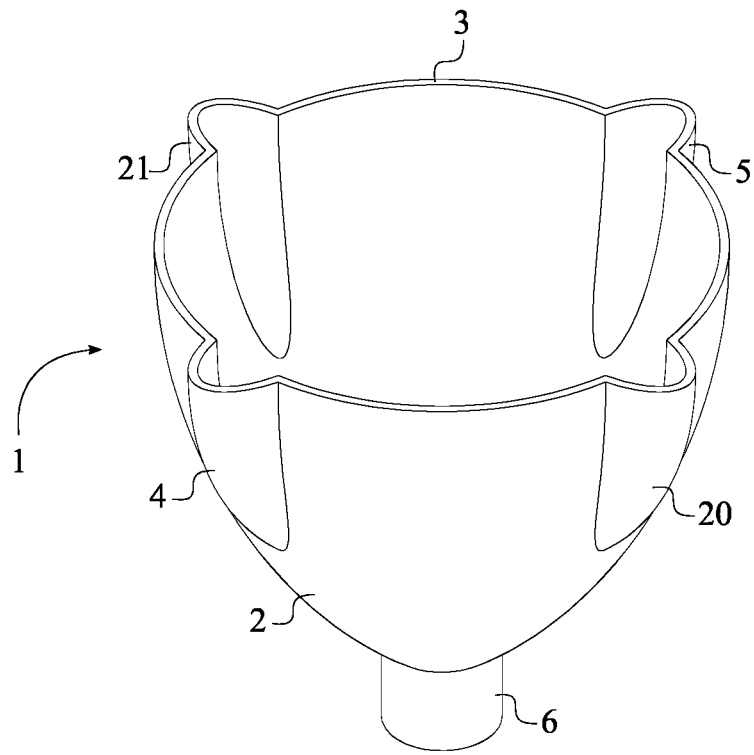
FIG. 1 is a top perspective view of the first embodiment of the present invention, showing the inside of the feeder cup.
Figure 2:
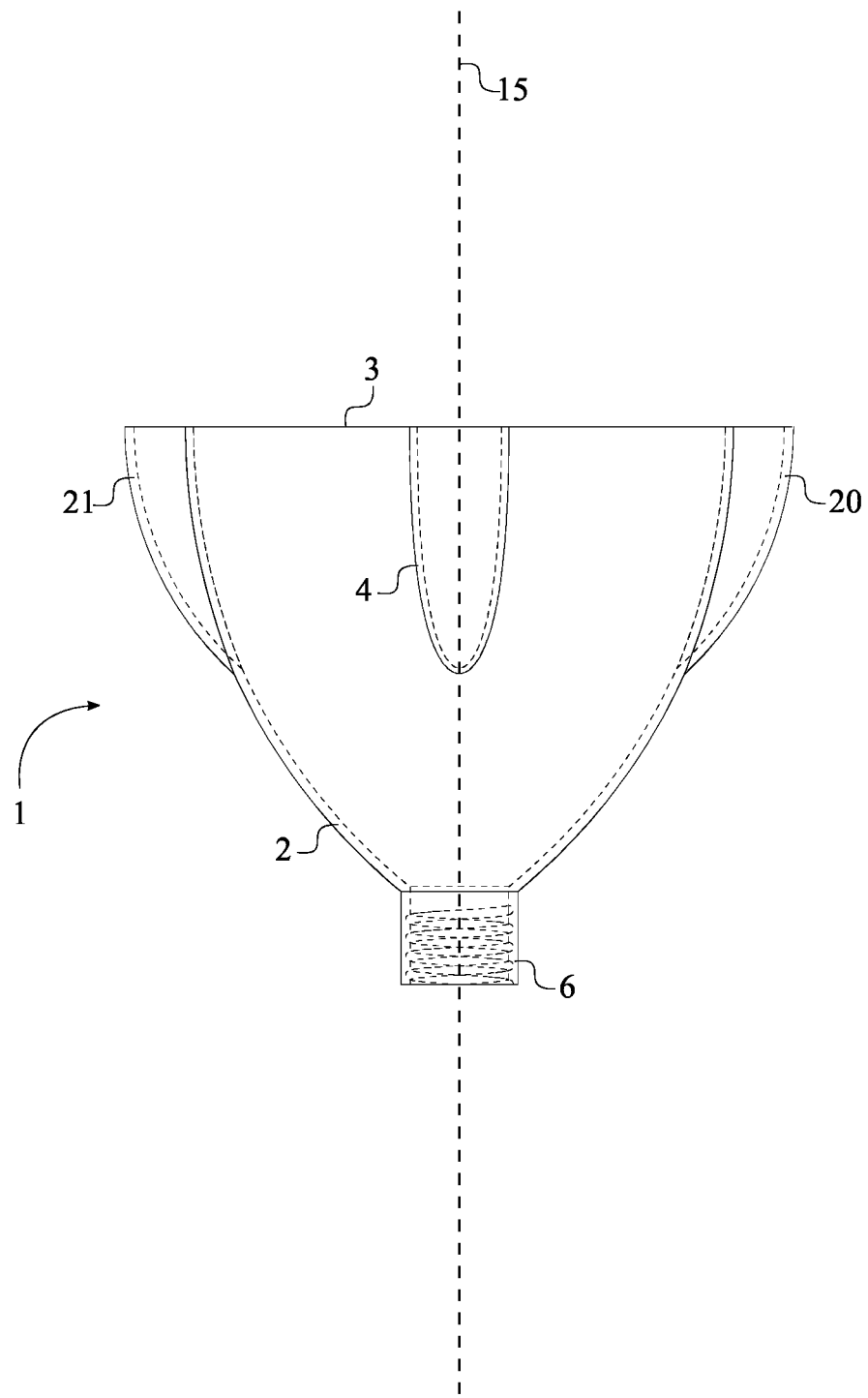
FIG. 2 is a side view of the first embodiment of the present invention, showing the threaded body for the connector.
Figure 3:
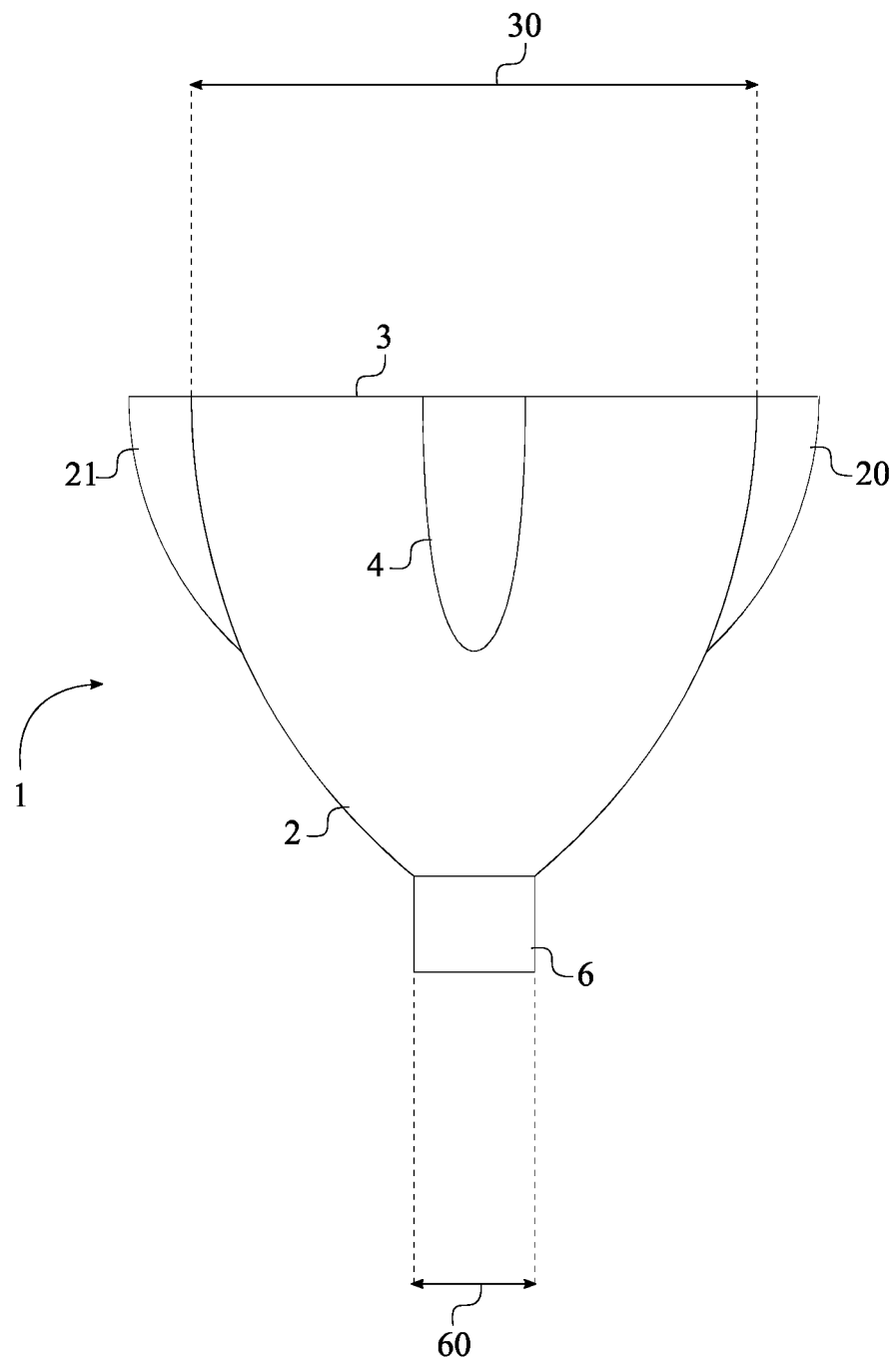
FIG. 3 is a side view of the first embodiment of the present invention, showing the diameter difference between the rim and the connector.

The feeder cup 1 provides sufficient storage area for water or fertilizer and comprises a tapered body 2 and a rim 3 as shown in FIG. 1. More specifically, the rim 3 is delineated by the tapered body 2 and provides an opening to pour in the water or fertilizer into the feeder cup 1. The rim 3 and the connector 6 are oppositely positioned of each other about the tapered body 2 so that the user can easily and steadily grip the handle 7 or the handle portion of the existing watering wand from one end of the present invention while the water or fertilizer being poured into the feeder cup 1 from the other end of the present invention. In reference to FIG. 3, a diameter 30 of the rim 3 is larger than a diameter 60 of the connector 6 so that the orientation of the tapered body 2 can be defined with respect the positioning of the handle Tor handle portion of the existing watering wand. Furthermore, the larger diameter 30 of the rim 3 also aids into fully emptying the water or fertilizer that is stored within the feeder cup 1.

Figure 8:
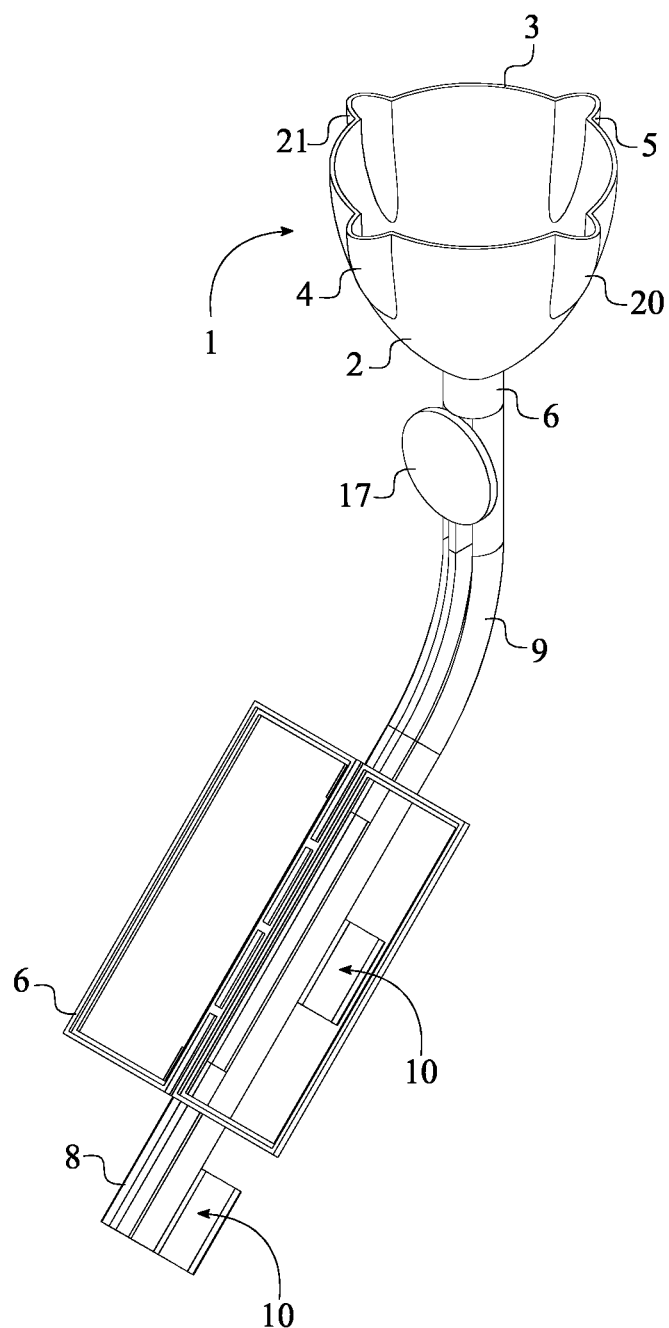
FIG. 8 is a perspective view of the second embodiment of the present invention, wherein the storage tray is attached to the handle.
Figure 9:
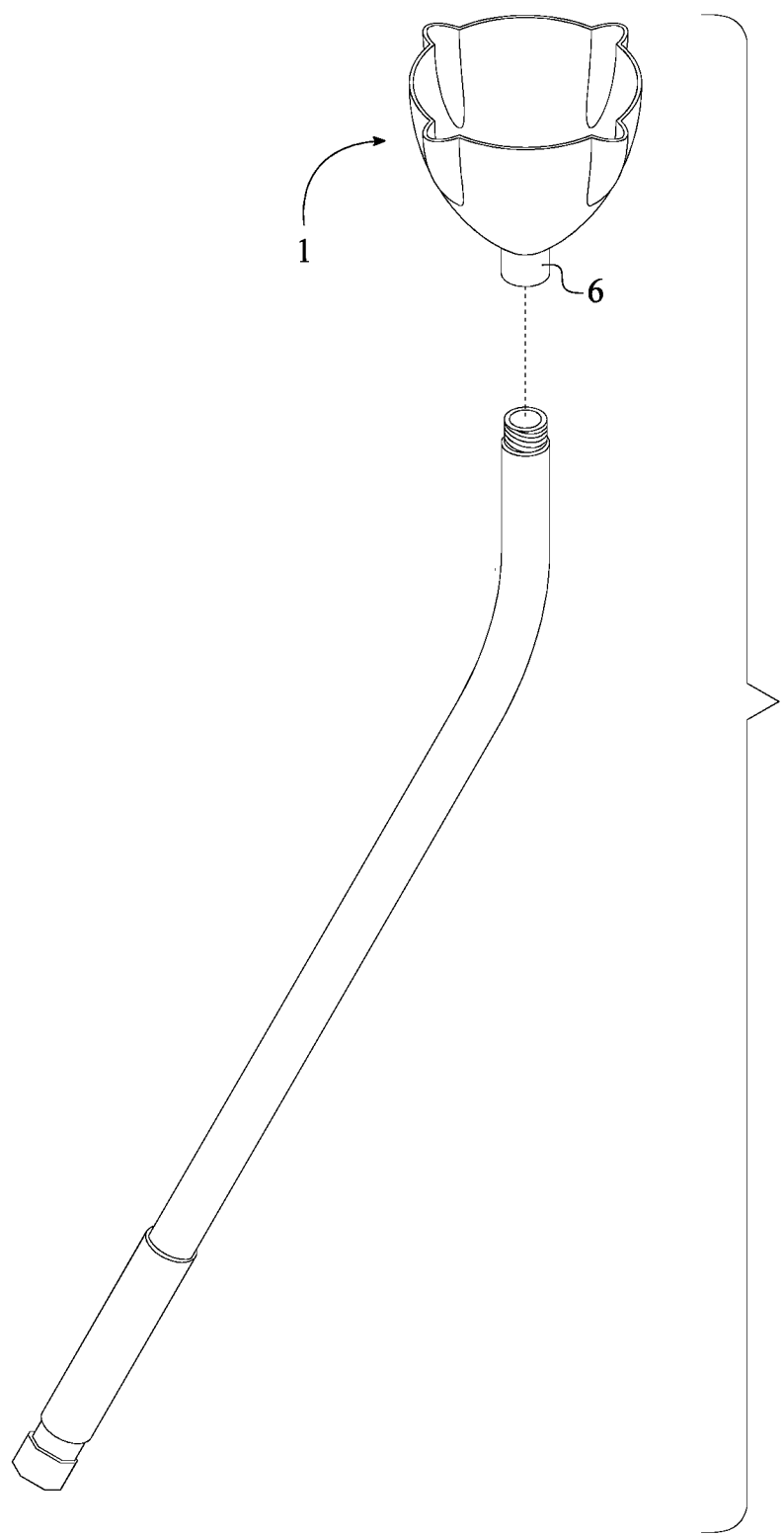
FIG. 9 is a perspective exploded view of the first embodiment of the present invention with an existing watering wand, wherein the first embodiment is screwed onto the existing watering wand.

Furthermore, the feeder cup 1 comprises a first pouring section 4, a second pouring section 5, a third pouring section 20, and a fourth pouring section 21 as shown in FIG. 1 and FIG. 8. The first pouring section 4, the second pouring section 5, the third pouring section 20, and the fourth pouring section 21 are radially integrated into the feeder cup 1 so that the user can easily redirect the discharging flow of water or fertilizer away from the feeder cup 1.

In reference to FIG. 1 and FIG. 8, the first pouring section 4 and the second pouring section 5 are diametrically opposed of each other about the feeder cup 1. The first pouring section 4 and the second pouring section 5 are positioned adjacent to the rim 3 and laterally connected onto the tapered body 2 so that the discharging water or fertilizer can be channeled through. Due to the diametric positioning of the first pouring section 4 and the second pouring section 5, the present invention can be easily utilized by right handed users and left handed user.

In reference to FIG. 1 and FIG. 8, the third pouring section 20 and the fourth pouring section 21 are diametrically opposed of each other about the feeder cup 1. The third pouring section 20 and the fourth pouring section 21 are positioned adjacent to the rim 3 and laterally connected onto the tapered body 2 so that the discharging water or fertilizer can be channeled through. Due to the diametric positioning of the third pouring section 20 and the fourth pouring section 21, the present invention can be easily utilized by right handed users and left handed user.

In reference to FIG. 6, an angle between the bend section 9 and the straight section 8 is an obtuse angle 16 in order to maximize the operational height of the second embodiment while efficiently discharging the stored water or fertilizer with a simple tilted of the user's hand.

The handle 7 is preferably made into a circular ergonomic body so that the user can comfortably grip the present invention during usage. The length of the handle 7 can be determined upon industry standard or manufacture requirement, wherein the length can be any length without departing from the original scope of the invention. For example, in one configuration of the second embodiment, the length ranges from 10 to 14 inches so that the handle 7 can be delineated as a shorter handle body. Another configuration of the second embodiment, the length ranges from 29 to 33 inches so that the handle 7 can be delineated as a longer handle body.

Figure 7:
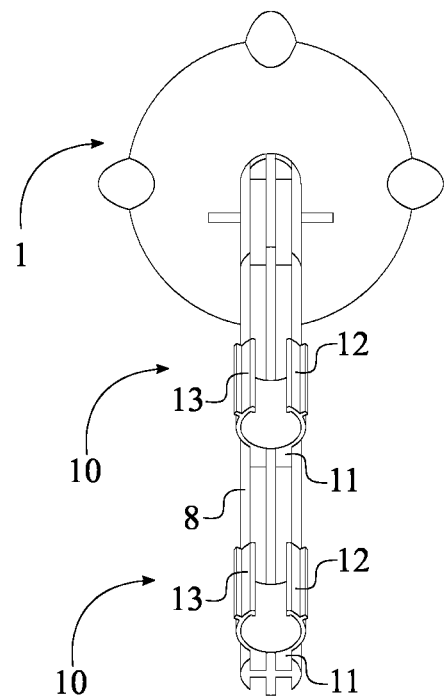
FIG. 7 is a bottom view of the second embodiment of the present invention, showing the components of each of the plurality of attachments.

Furthermore, a first set of tracks and a second set of tracks are traversed along the length of the handle 7 as shown in FIG. 7. The first set of tracks and the second set of tracks are oppositely positioned of each other about the handle 7 so that a plurality of attachments 10 that preferably attaches the second embodiment to an existing watering wand and a storage tray 14 that functions as a storage compartment can be firmly secured into the body of the handle 7.

The plurality of attachments 10 is connected along the straight section 8 and functions as friction-fit attachment clips so that the handle 7 can be attached to an existing watering wand for easy access when the present invention is utilized within gardening applications. Furthermore, the plurality of attachments 10 can also be utilized to attach the present invention to a circular body during storage. Each of the plurality of attachments 10 comprises a base 11, a first arm 12, and a second arm 13 as shown in FIG. 7. The first arm 12 and the second arm 13 are generally formed as curved bodies so that the first arm 12 and the second arm 13 can tangentially grip around an existing watering wand or the circular body. The first arm 12 is terminally connected onto the base 11. The second arm 13 is terminally connected onto the base 11, opposite of the first arm 12. The base 11 is connected onto the straight section 8, opposite of the first arm 12 and the second arm 13. More specifically, the base 11 is engaged within the first set of tracks thus permanently securing the plurality of attachments 10 to the handle 7. Resultantly, when the present invention pressed upon a securing body (an existing watering wand or circular body), the first arm 12 and the second arm 13 flex around the circular profile of the securing body thus engaging the handle 7 to the securing body.

In reference to FIG. 8, the storage tray 14 is removably mounted to the straight section 8 so that the user is able to store packages of seeds, fertilizer, pesticides, fungicides, or other materials generally understood to be used in home gardening applications. More specifically, an interlocking section of the storage tray 14 is engaged within the second set of tracks thus mounting the storage tray 14 to the handle 7. Furthermore, at least one frame section of the storage tray 14 is connected onto the interlocking section and functions as a structural body to retain the package of seeds, fertilizer, pesticides, fungicides, or other materials generally understood to be used in home gardening applications.

The second embodiment further comprises a platform 17 that is laterally connected onto the handle 7 as shown in FIG. 8. The platform 17 can be utilized to display marketing information, logo/company information, instructional information, or any other type of information regarding gardening applications. For example, an adhesive sheet that contains instructional information can be adhered onto the platform 17 so that the user can be informed about how to properly use the present invention.

Although the invention has been explained in relation to its preferred embodiment, it is to be understood that many other possible modifications and variations can be made without departing from the spirit and scope of the invention as hereinafter claimed.

What is claimed is:

1. A gardening apparatus comprising:
a feeder cup;
a connector;
a central axis;
a handle;
a plurality of attachments;
the feeder cup comprising a first pouring section, a second pouring section, a third pouring section, and a fourth pouring section;
the feeder cup and the connector being concentrically aligned along the central axis;
the feeder cup and the connector being adjacently connected to each other; and
the first pouring section, the second pouring section, the third pouring section, and the fourth pouring section being radially integrated into the feeder cup;
the handle comprising a straight section and a bend section;
the bend section being angularly connected to the straight section; and
the connector being terminally connected to the bend section, opposite of the straight section;
the plurality of attachments being connected along the straight section;
each of the plurality of attachments comprising a base, a first arm, and a second arm;
the first arm being terminally connected onto the base;
the second arm being terminally connected onto the base, opposite of the first arm; and
the base being connected onto the straight section, opposite of the first arm and the second arm.

2. The gardening apparatus as claimed in claim 1 comprising:
the feeder cup comprising a tapered body and a rim;
the rim being delineated by the tapered body; and
the rim and the connector being oppositely positioned of each other about the tapered body.

3. The gardening apparatus as claimed in claim 2, wherein a diameter of the rim is larger than a diameter of the connector.

4. The gardening apparatus as claimed in claim 2 comprising:
the first pouring section and the second pouring section being diametrically opposed of each other about the feeder cup;
the first pouring section and the second pouring section being positioned adjacent to the rim; and
the first pouring section and the second pouring section being laterally connected onto the tapered body.

5. The gardening apparatus as claimed in claim 2 comprising:
the third pouring section and the fourth pouring section being diametrically opposed of each other about the feeder cup;
the third pouring section and the fourth pouring section being positioned adjacent to the rim; and
the third pouring section and the fourth pouring section being laterally connected onto the tapered body.

6. The gardening apparatus as claimed in claim 1, wherein the connector is an internally threaded body.

7. The gardening apparatus as claimed in claim 1, wherein an angle between the bend section and the straight section is an obtuse angle.

8. The gardening apparatus as claimed in claim 1 comprising:
a storage tray; and
the storage tray being removably mounted to the straight section.

9. The gardening apparatus as claimed in claim 1 comprising:
a platform; and
the platform being connected to the bend section.

* * * * *